(12) United States Patent
Valerio et al.

(10) Patent No.: US 12,378,038 B2
(45) Date of Patent: Aug. 5, 2025

(54) RESEALABLE BAG WITH INELASTIC DEFORMABLE POLYMER

(71) Applicant: T12 LLC, Tucson, AZ (US)

(72) Inventors: Pascal Diego Valerio, San Diego, CA (US); Hugo Miguel Lisboa Oliveira, Campina Grande (BR)

(73) Assignee: T12 LLC, Tucson, AZ (US)

( * ) Notice: Subject to any disclaimer, the term of this patent is extended or adjusted under 35 U.S.C. 154(b) by 338 days.

(21) Appl. No.: 17/888,911

(22) Filed: Aug. 16, 2022

(65) Prior Publication Data

US 2022/0388726 A1    Dec. 8, 2022

Related U.S. Application Data

(63) Continuation-in-part of application No. 17/333,778, filed on May 28, 2021, now abandoned.

(Continued)

(51) Int. Cl.
| | |
|---|---|
| *B65D 33/30* | (2006.01) |
| *B32B 27/08* | (2006.01) |

(Continued)

(52) U.S. Cl.
CPC ............. *B65D 33/30* (2013.01); *B32B 27/08* (2013.01); *B32B 27/10* (2013.01); *B32B 27/32* (2013.01); *B65D 65/466* (2013.01); *B65D 75/26* (2013.01); *B65D 75/52* (2013.01); *C08G 18/6607* (2013.01); *C08G 18/735* (2013.01); *C08L 75/08* (2013.01); *B32B 2255/12* (2013.01); *B32B 2255/26* (2013.01); *B32B 2307/518* (2013.01);

(Continued)

(58) Field of Classification Search
CPC ... B32B 27/08; B32B 27/271; B32B 27/2732; B32B 2255/12; B32B 2255/26; B32B 2307/518; B32B 2439/46; B32B 2439/70; B65D 65/466
See application file for complete search history.

(56) References Cited

U.S. PATENT DOCUMENTS

| | | |
|---|---|---|
| 1,207,533 A | 12/1916 | Gamble |
| 3,256,941 A | 6/1966 | Rivman |

(Continued)

FOREIGN PATENT DOCUMENTS

| | | |
|---|---|---|
| CN | 203111747 U | 8/2013 |
| CN | 206297921 U | 7/2017 |

(Continued)

OTHER PUBLICATIONS

English machine translation for CN103709448. (Year: 2014).*

(Continued)

*Primary Examiner* — Michael C Miggins
(74) *Attorney, Agent, or Firm* — Jacob M. Ward; Ward Law Office LLC

(57) ABSTRACT

The resealable bag has a main body including a resealing layer. The resealable bag is selectively positionable between an open, unsealed position and a closed, sealed position. When the resealable bag is in the closed, sealed position, the resealing layer is in a deformed shape. Advantageously, the resealable bag can be repeatedly rolled and sealed, and unrolled and unsealed, as desired without the use of additional integrated or non-integrated sealing mechanisms.

20 Claims, 10 Drawing Sheets

Related U.S. Application Data

(60) Provisional application No. 63/163,406, filed on Mar. 19, 2021, provisional application No. 63/094,604, filed on Oct. 21, 2020, provisional application No. 63/049,675, filed on Jul. 9, 2020, provisional application No. 63/031,639, filed on May 29, 2020.

(51) Int. Cl.

| | | |
|---|---|---|
| *B32B 27/10* | (2006.01) | |
| *B32B 27/32* | (2006.01) | |
| *B65D 65/46* | (2006.01) | |
| *B65D 75/26* | (2006.01) | |
| *B65D 75/52* | (2006.01) | |
| *C08G 18/66* | (2006.01) | |
| *C08G 18/73* | (2006.01) | |
| *C08L 75/08* | (2006.01) | |

(52) U.S. Cl.
CPC ....... *B32B 2439/46* (2013.01); *B32B 2439/70* (2013.01); *B32B 2439/80* (2013.01); *B65D 2575/586* (2013.01)

(56) References Cited

U.S. PATENT DOCUMENTS

| | | | |
|---|---|---|---|
| 3,266,711 | A | 8/1966 | Song |
| 3,537,636 | A | 11/1970 | Rochette |
| 3,554,436 | A | 1/1971 | Palmer |
| 3,764,060 | A | 10/1973 | Ruda |
| 3,822,441 | A | 7/1974 | Paxton |
| 4,720,423 | A | 1/1988 | Fraser |
| 4,848,649 | A | 7/1989 | Fuller et al. |
| 4,903,841 | A | 2/1990 | Ohsima et al. |
| 5,042,663 | A | 8/1991 | Heinrich |
| 5,137,154 | A | 8/1992 | Cohen |
| 5,176,452 | A | 1/1993 | Stern |
| 5,766,399 | A | 6/1998 | Clark |
| 5,776,044 | A | 7/1998 | Clark |
| 5,972,396 | A | 10/1999 | Jurgovan et al. |
| 6,290,392 | B1 | 9/2001 | Sandor |
| 6,365,248 | B1 | 4/2002 | Hayashi et al. |
| 6,530,089 | B2 | 3/2003 | Frye |
| 6,767,131 | B2 | 7/2004 | Taheri |
| 6,846,305 | B2 | 1/2005 | Smith et al. |
| 7,396,163 | B2 | 7/2008 | McGregor |
| 8,122,687 | B2 | 2/2012 | Kinigakis et al. |
| 8,485,728 | B2 | 7/2013 | Bowers et al. |
| 10,377,546 | B2 | 8/2019 | Branyon |
| 2004/0234175 | A1 | 11/2004 | Takita et al. |
| 2006/0156696 | A1 | 7/2006 | Bezek et al. |
| 2006/0285779 | A1 | 12/2006 | Golas |
| 2007/0042146 | A1 | 2/2007 | Sharp |
| 2008/0010778 | A1 | 1/2008 | Tse |
| 2009/0092807 | A1 | 4/2009 | Hu et al. |
| 2009/0297069 | A1 | 12/2009 | Bray |
| 2010/0074561 | A1 | 3/2010 | Feig |
| 2010/0142862 | A1 | 6/2010 | Sam |
| 2010/0142864 | A1 | 6/2010 | Czarny |
| 2011/0019941 | A1 | 1/2011 | Ghazali |
| 2011/0284550 | A1 | 11/2011 | Gersovitz |
| 2015/0136781 | A1 | 5/2015 | Ginn |
| 2016/0089855 | A1 | 3/2016 | Gwin et al. |
| 2016/0303888 | A1 | 10/2016 | O'Donnell et al. |
| 2018/0229897 | A1 | 8/2018 | Abed |
| 2019/0023480 | A1 | 1/2019 | Lin |
| 2019/0193380 | A1 | 6/2019 | Salant et al. |
| 2019/0307642 | A1 | 10/2019 | Schlack et al. |
| 2021/0371179 | A1 | 12/2021 | Valerio |
| 2022/0388726 | A1 | 12/2022 | Valerio et al. |

FOREIGN PATENT DOCUMENTS

| | | | | |
|---|---|---|---|---|
| FR | 1221819 A | | 6/1960 | |
| JP | S63294355 A | | 12/1988 | |
| JP | 2005075451 A | | 3/2005 | |
| WO | WO-2008045260 A2 | * | 4/2008 | ......... B29C 47/0021 |
| WO | 2022167730 A1 | | 8/2022 | |

OTHER PUBLICATIONS

English machine translation for JP H0752028. (Year: 1995).*
Written Opinion of the International Searching Authority dated Aug. 31, 2021.
Abdullah et al., Determination of Shape Fixity and Shape Recovery Rate of Carbon Nanotube-filled Shape Memory Polymer Nanocomposites, SciVerse ScienceDirect, 2012, pp. 1641-1646, Procedia Engineering 41, Elsevier Ltd.
Santo et al., Shape Memory Composites For Self-Deployable Structures In Aerospace Applications, ScienceDirect, 2014, pp. 42-47, Procedia Engineering 88, Elsevier Ltd.
Yu et al., Reduced time as a unified parameter determining fixity and free recovery of shape memory polymers, Nature Communications Article, Jan. 15, 2014, pp. 1-9, 5:3066, DOI: 10.1038/ncomms4066, Macmillan Publishers imited.
Written Opinion of the International Searching Authority dated Nov. 3, 2023.

\* cited by examiner

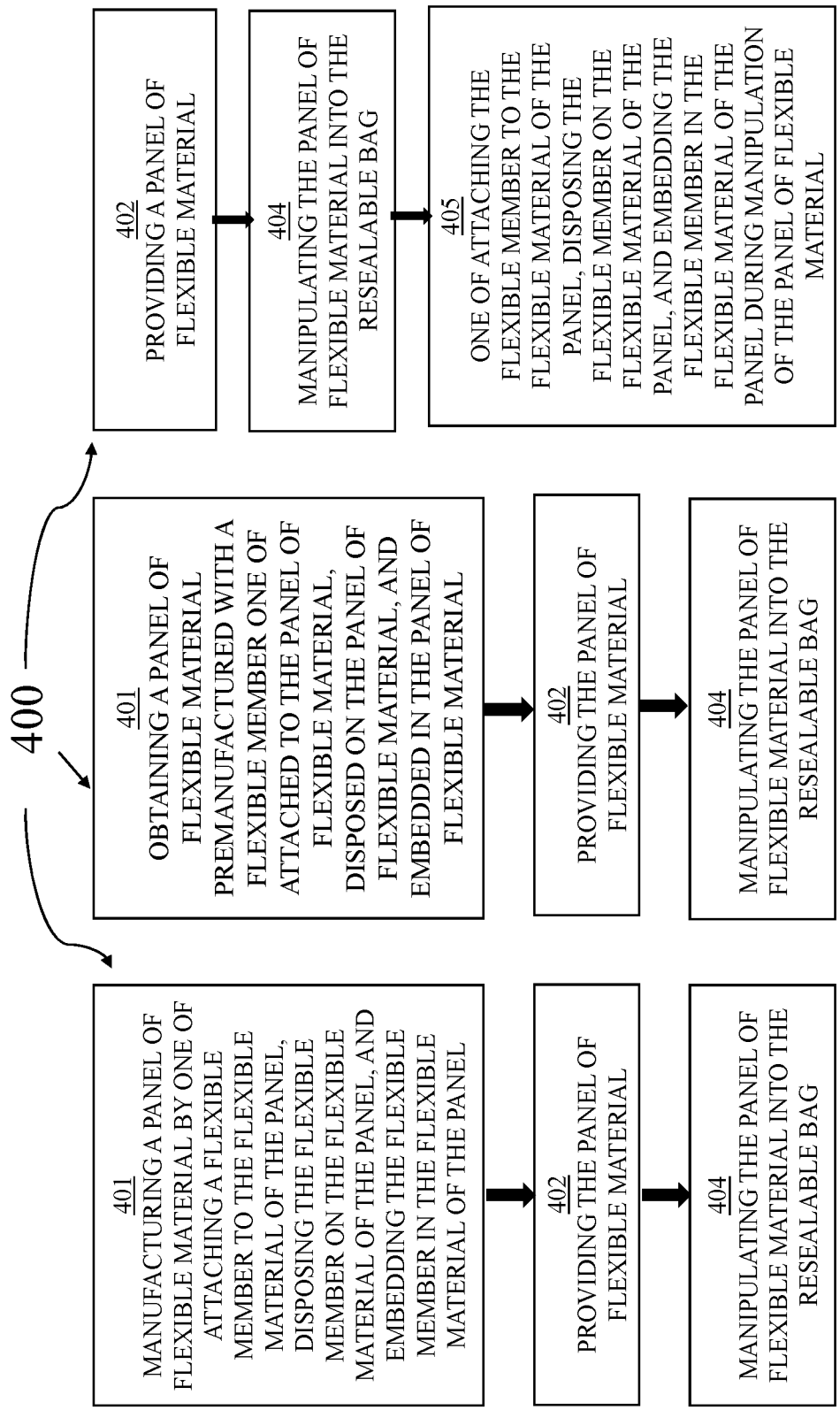

RESEALABLE BAG WITH INELASTIC DEFORMABLE POLYMER

CROSS-REFERENCE TO RELATED APPLICATIONS

This application is a continuation-in-part of U.S. patent application Ser. No. 17/333,778, filed on May 28, 2021, which claims priority to U.S. Provisional Application Ser. No. 63/163,406, filed on Mar. 19, 2021, U.S. Provisional Application Ser. No. 63/094,604, filed on Oct. 21, 2020, U.S. Provisional Application Ser. No. 63/049,675, filed on Jul. 9, 2020, and U.S. Provisional Application Ser. No. 63/031,639, filed on May 29, 2020. The entire disclosure of each of the above applications is incorporated herein by reference.

FIELD

The present disclosure relates generally to flexible packaging and, more specifically, to a resealable bag including at least one flexible member adapted to maintain the resealable bag in a closed configuration.

INTRODUCTION

This section provides background information related to the present disclosure which is not necessarily prior art.

A large variety of packaging solutions are available and used in industries such as food and beverage, cosmetics and personal care, fashion, and pharmaceutical and healthcare. Flexible packaging such as bags and pouches, for example, is widely used in the food industry for products such as chips and other snack foods, cereal, coffee, bread, and other food items. Flexible packaging for food items provides efficient storage and allows a user to easily access the contents of the flexible packaging. However, the food items contained in flexible packaging often do not remain fresh once the flexible packaging has been opened because the flexible packaging naturally remains in an open position.

It is known to include external, non-integrated closing mechanisms with flexible packaging. For example, certain flexible packaging may come with one or more twist ties, bag closures, elastic bands, or adhesives. In one example, as described in U.S. Pat. No. 3,822,441 to Paxton, a plastic clip with a narrow opening and an internal aperture is wrapped around the neck of a flexible bag. However, these non-integrated closing mechanisms often do not function properly and break throughout the life of the items being stored, are easy to lose, and do not always prevent the items from spilling out of the flexible packaging.

It is also known to include an integrated closing mechanism with flexible packaging. In one example, as described in U.S. Pat. No. 3,266,711 to Song, an elongate male member extends transversely across a mouth of a bag and connects to a female member. A portion of the bag is maintained in a closed position when the male and female members are pressed together. In another example, as described in U.S. Pat. No. 3,256,941 to Rivman, a pressure-sensitive adhesive disposed on a flap adjacent an opening of a bag is used to maintain a flexible package in a closed position. However, these integrated closing mechanisms are often expensive to manufacture, ineffective or faulty, and can be difficult or cumbersome for kids, elderly people, and the general population to use.

Accordingly, there is a continuing need for a resealable bag that includes an integrated, low-cost closing mechanism that effectively maintains the resealable bag in a closed position. Desirably, the resealable bag is easy-to-use and adaptable throughout the life of the items being stored.

SUMMARY

In concordance with the instant disclosure, a resealable bag that is easy-to-use, adaptable throughout the life of the items being stored, and that includes an integrated, low-cost closing mechanism that effectively maintains the resealable bag in a closed position, has surprisingly been discovered.

In one embodiment, a resealable bag includes a main body and at least one flexible member that is one of attached to the main body, disposed on the main body, and embedded in the main body. The resealable bag is selectively positionable between an open, unsealed position and a closed, sealed position. When the resealable bag is in the closed, sealed position, the at least one flexible member is in a deformed shape.

In another embodiment, a system for manufacturing a resealable bag includes a dispensing mechanism adapted to dispense a panel of flexible material and a machine adapted to form the panel of flexible material into the resealable bag. The resealable bag has a main body and a flexible member that is one of attached to the panel of flexible material, disposed on the panel of flexible material, and embedded in the panel of flexible material.

In a further embodiment, a method of manufacturing a resealable bag includes the steps of providing a panel of flexible material and manipulating the panel of flexible material into the resealable bag. The resealable bag has a main body and a flexible member that is one of attached to the panel of flexible material, disposed on the panel of flexible material, and embedded in the panel of flexible material.

In yet another embodiment, a resealable bag includes a main body including a resealing layer. The resealable bag is selectively positionable between an open, unsealed position and a closed, rolled, and sealed position. When the resealable bag is in the closed, sealed position, the resealing layer is in a deformed shape.

In yet a further embodiment, a method of manufacturing a resealable bag includes a first step of providing a panel of flexible material with a resealing layer including a polymer formed out of an oil, a chain extender, a biodegradable polymer, and a cross linking agent. The second step includes manipulating the panel of flexible material into the resealable bag.

In yet an additional embodiment, an inelastic deformable polymer for a resealable bag includes an admixture of: an oil; a chain extender; a biodegradable polymer; and a cross linking agent.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 12 is a method of making a resealable bag according to another embodiment of the present disclosure;

FIG. 13 is a method of making a resealable bag according to another embodiment of the present disclosure; and FIG. 14 is a method of making a resealable bag according to another embodiment of the present disclosure.

DETAILED DESCRIPTION

Figure 1A:
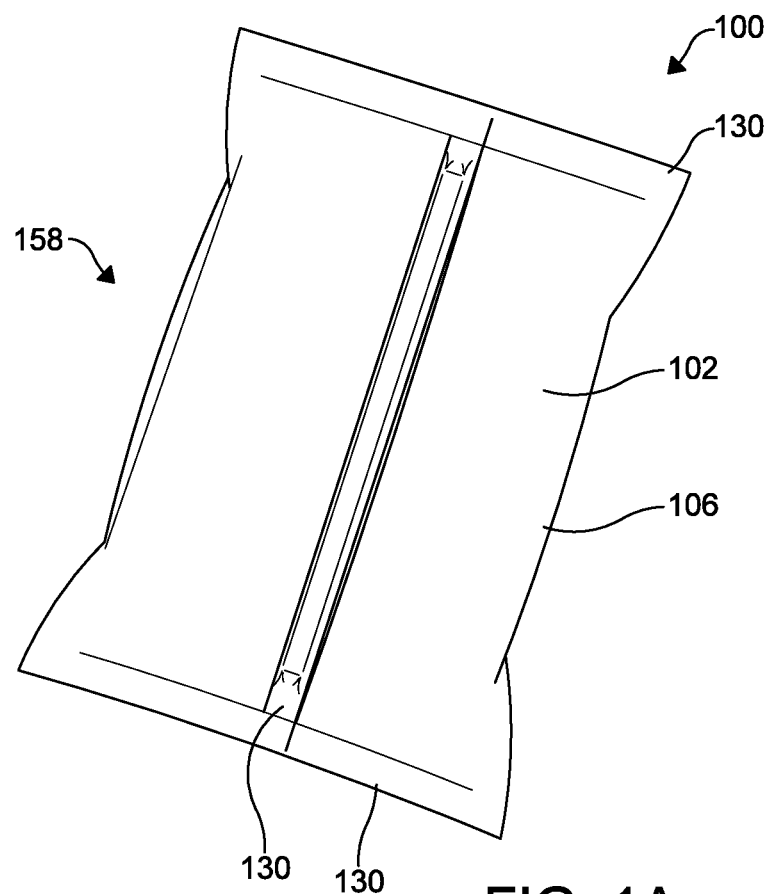
FIG. 1A is a rear perspective view of a resealable bag according to one embodiment of the present disclosure, the resealable bag in a closed, un-opened first position.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-11, a resealable bag 100 including a main body 102 and at least one flexible member 104 is shown. The resealable bag 100 may be used in a variety of different industries and for a variety of end uses. As non-limiting examples, the resealable bag 100 may be useful in industries including food and beverage, pet care, cosmetics, health and beauty, and pharmaceutical and healthcare, as well as for any appropriate consumer, household, and industrial products. Though the resealable bag 100 is shown throughout the drawings and described in the specification as a bag for snacks and other food items, it should be further appreciated that food storage is one non-limiting example in which the resealable bag 100 may be employed. A skilled artisan may select any other suitable application for the resealable bag 100, as desired. Likewise, aspects of the resealable bag 100, including aspects relating to size, shape, and dimensions thereof, can be tailored by one skilled in the art as necessary to accommodate various sizes, shapes, and dimensions of the respective product(s) to be contained therein.

It should be further appreciated that the resealable bag 100 may be any suitable shape, size, and configuration, as desired, and may not resemble a conventional bag according to certain embodiments. For example, pouches, sleeves, wraps, and other pliable product containers are contemplated in the present disclosure. Additionally, the dimensions of the resealable bag 100 may be any suitable dimensions for the desired end use. Advantageously, the resealable bag 100 may be scaled, as needed.

The main body 102, according to certain embodiments, may be formed from a panel 106, as shown in FIGS. 1A, 1B, 1C, 1D, and 2. The panel 106 may be fabricated using any suitable material or materials, as dictated by the desired end use. As non-limiting examples, polymer films, paper, plastic, aluminum foil, cellulosic film, bioplastic film, polypropylene fabric, and any other materials adapted to enclose and maintain the integrity of the contents of the resealable bag 100 may be used. In certain embodiments, the panel 106 may be fabricated using one material. In alternative embodiments, the panel 106 may be fabricated using a combination of materials. A skilled artisan may select any shape, size, and configuration for the panel 106, as desired. In certain embodiments, more than one panel 106 may be used to form the main body 102.

Figure 2:
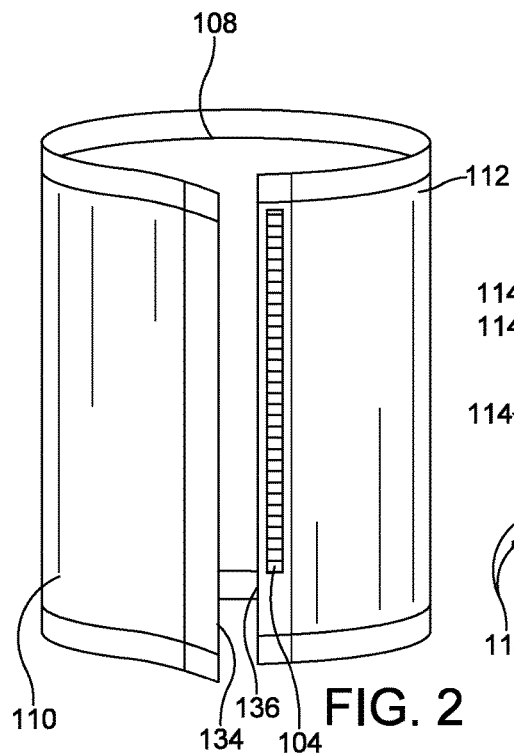
FIG. 2 is a rear perspective view of a panel of the resealable bag shown in FIG. 1A.

In a most particular embodiment, as shown in FIG. 2, the panel 106 may include a front panel section 108, a rear left panel section 110, and a rear right panel section 112. The front panel section 108, rear left panel section 110, and rear right panel section 112 may be integral with one another or separate components that are permanently or removably connected to one another according to various embodiments of the present disclosure. A skilled artisan may select any number of panel sections having any desirable shape, size, and configuration.

In certain embodiments, the panel 106 may include one or more layers 114. Any suitable number of layers 114 may be selected by a person of skill in the art. Each layer 114 may be fabricated using one or more materials, and in certain embodiments including more than one layer 114, each layer 114 may be identical to one another or different according to various embodiments of the present disclosure.

Figure 3:
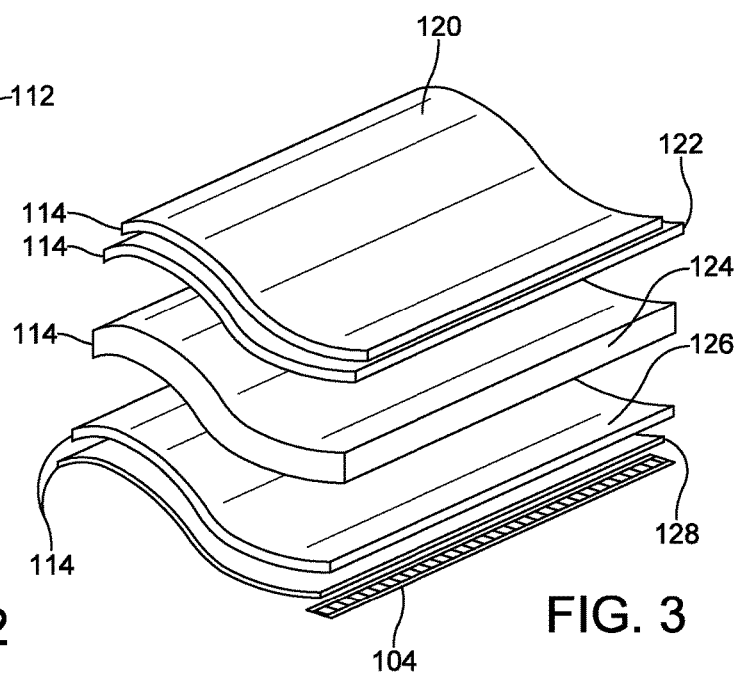
FIG. 3 is a side perspective view of a plurality of layers and a flexible member of a resealable bag according to another embodiment of the present disclosure.
Figure 5:
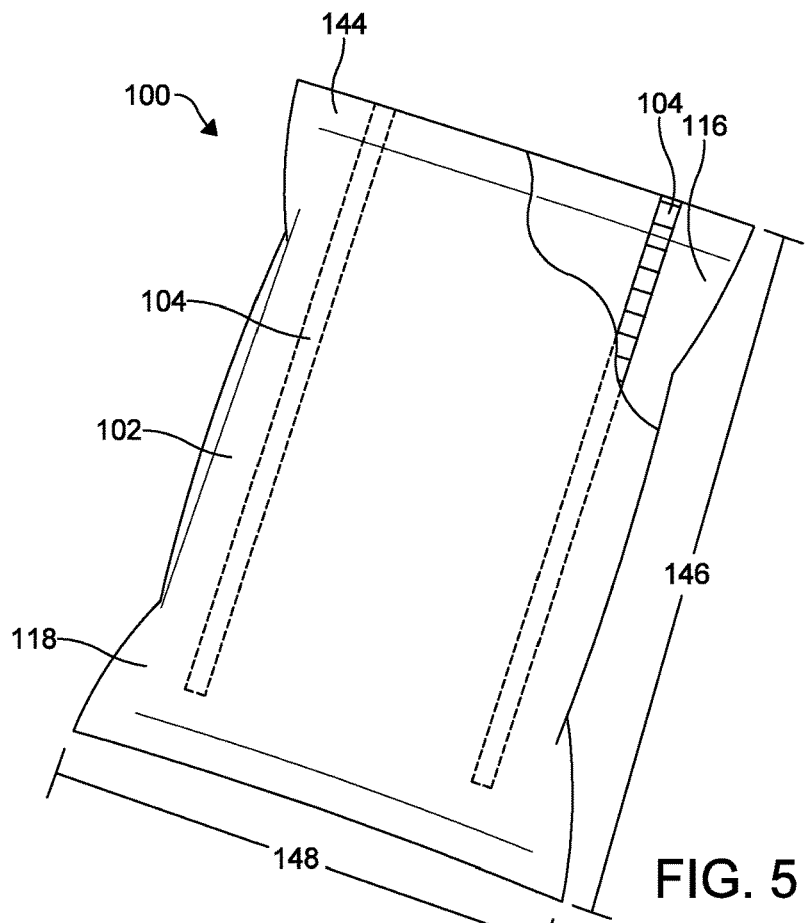
FIG. 5 is a front perspective view of a resealable bag according to another embodiment of the present disclosure, the resealable bag shown with a section of the outer layer of the main body removed.
Figure 6:
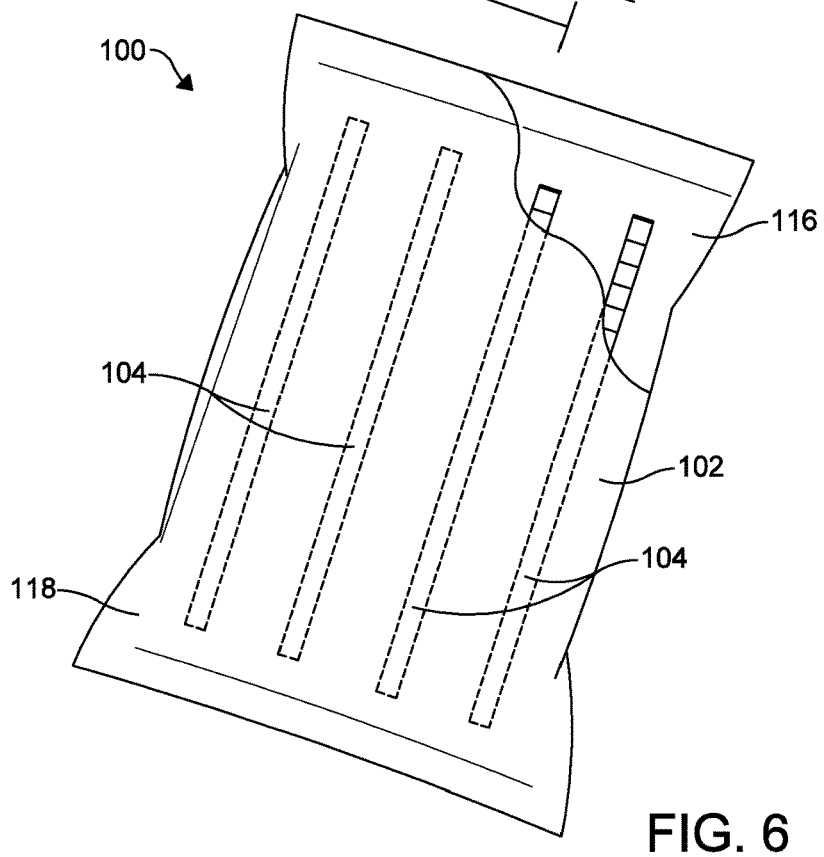
FIG. 6 is a front perspective view of a resealable bag according to another embodiment of the present disclosure, the resealable bag shown with a section of the outer layer of the main body removed.

As a non-limiting example, as shown in FIGS. 5 and 6, the panel 106 may be formed using two layers 114, an inner layer 116 and an outer layer 118. In certain embodiments, as shown in FIG. 3, the panel 106 may include a plurality of layers 114. Suitable materials may include, but are not limited to sealant, thermoplastic resins such as biaxially oriented polypropylene (BOPP) and low-density polyethylene (LDPE), metalized biaxially oriented polypropylene (MET BOPP), paper, synthetic paper, overprint varnish (OPV), plastic, polymer films, aluminum foil, cellulosic film, bioplastic film, polypropylene fabric, Surlyn®, and any other suitable material. In a more particular embodiment, with renewed reference to FIG. 3, the panel may include a layer of OPV varnish 120, a layer of synthetic paper 122, a layer of LDPE 124, a layer of MET BOPP 126, and a layer of sealant 128, as non-limiting examples. Any suitable number and combination of layers 114 may be selected to form the panel 106, as desired, using any suitable materials.

The main body 102 may include one or more seals 130 according to various embodiments of the present disclosure. Each seal 130 is adapted to, in combination with the panel 106, form the main body 102 of the resealable bag 100 and contain the contents of the resealable bag 100. In certain embodiments, the one or more seals 130 may be broken by a user to access the contents of the resealable bag 100. The main body 102 may include one or more fin seals, lap seals, heat seals, or any other suitable types of seals, as non-limiting examples. A skilled artisan may select any suitable number of seals 130, orientation of seals 130, for example, vertical and horizontal, and type or combination of types of seals 130 for the resealable bag 100, as desired. Each seal 130 may be formed using any suitable adhesive, glue, or other bonding agent or mechanism, as non-limiting examples, or any combination thereof.

The combination of the panel 106 and the one or more seals 130 may form a square, tubular, vertically rectangular, horizontally rectangular, or any other geometrically shaped main body 102 of the resealable bag 100. The present disclosure contemplates any variety of shapes, sizes, and configurations for the resealable bag 100, as determined by a person skilled in the art.

The at least one flexible member 104 may be fabricated from any suitable flexible material or combination of materials according to various embodiments of the present disclosure. The flexible material may be malleable such that the user of the resealable bag 100 is able to position the at least one flexible member 104 in a deformed shape 132, as needed. The flexible material may also be sufficiently rigid so as to maintain the deformed shape 132. In other words, the at least one flexible member 104 will maintain the deformed shape 132 until the user repositions the at least one flexible member 104.

The at least one flexible member 104 may be any shape and size, as determined by one of skill in the art. Additionally, the dimensions of the at least one flexible member 104 may be any suitable dimensions for the desired end use. A person skilled in the art may select any desired length, width, malleability, and configuration for the at least one flexible member 104 based on the specifications of the main body 102 of the resealable bag 100 and, if needed, the contents of the resealable bag 100. Likewise, it should be appreciated that the number of flexible members 104 and the placement and positioning of the flexible members 104 within or on the main body 102 of the resealable bag 100 may be selected by one skilled in the art and scalable to the desired end use. As an example, a resealable bag 100 having a larger main body 102 or that is made using a thicker material may require additional flexible members 104 or flexible members 104 that are larger in size, for example, compared to a resealable bag 100 having a smaller main body 102.

Figure 4:
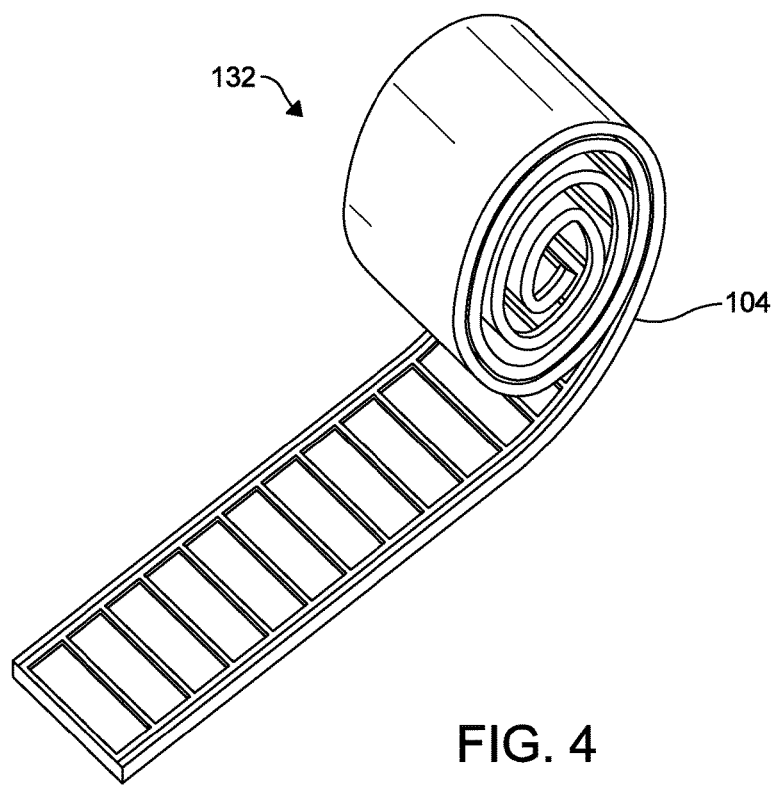
FIG. 4 is a top perspective view of a flexible member of the resealable bag shown in FIG. 1A.

As a non-limiting example, as shown in FIGS. 2-4, the at least one flexible member 104 may be a tin tie, and the flexible material may be galvanized steel wire. A skilled artisan may select other suitable flexible members 104 including flexible materials or a combination of flexible and non-flexible materials. For example, aluminum, copper, silver, and any other malleable materials may be used for the at least one flexible member 104, as desired. Likewise, plastic, paper, silicone, and other suitable materials may also be used in combination with one or more flexible, malleable materials. In certain embodiments, the at least one flexible member 104 may include one or more non-flexible materials in combination with one or more flexible materials.

As another non-limiting example, the at least one flexible member 104 may be a layer 114 of flexible material, or a layer 114 of flexible material including at least one flexible member 104. A malleable material such as aluminum foil, as a non-limiting example, or any other suitable material or combination of materials may be used, as determined by one of skill in the art.

Figure 1B:
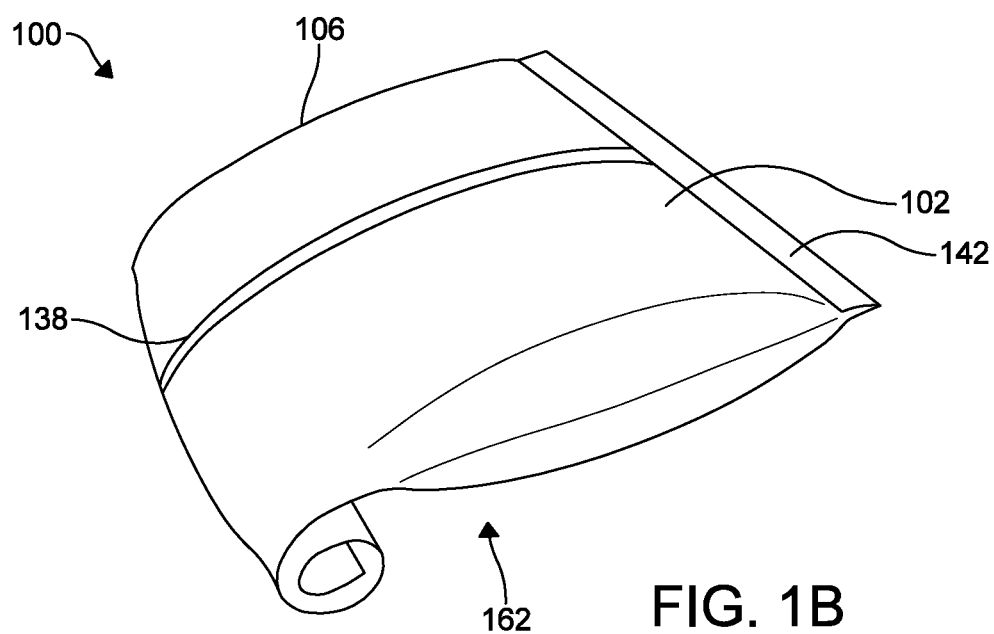
FIG. 1B is a side perspective view of the resealable bag shown in FIG. 1A, the resealable bag in a re-sealed, closed second position.
Figure 1C:
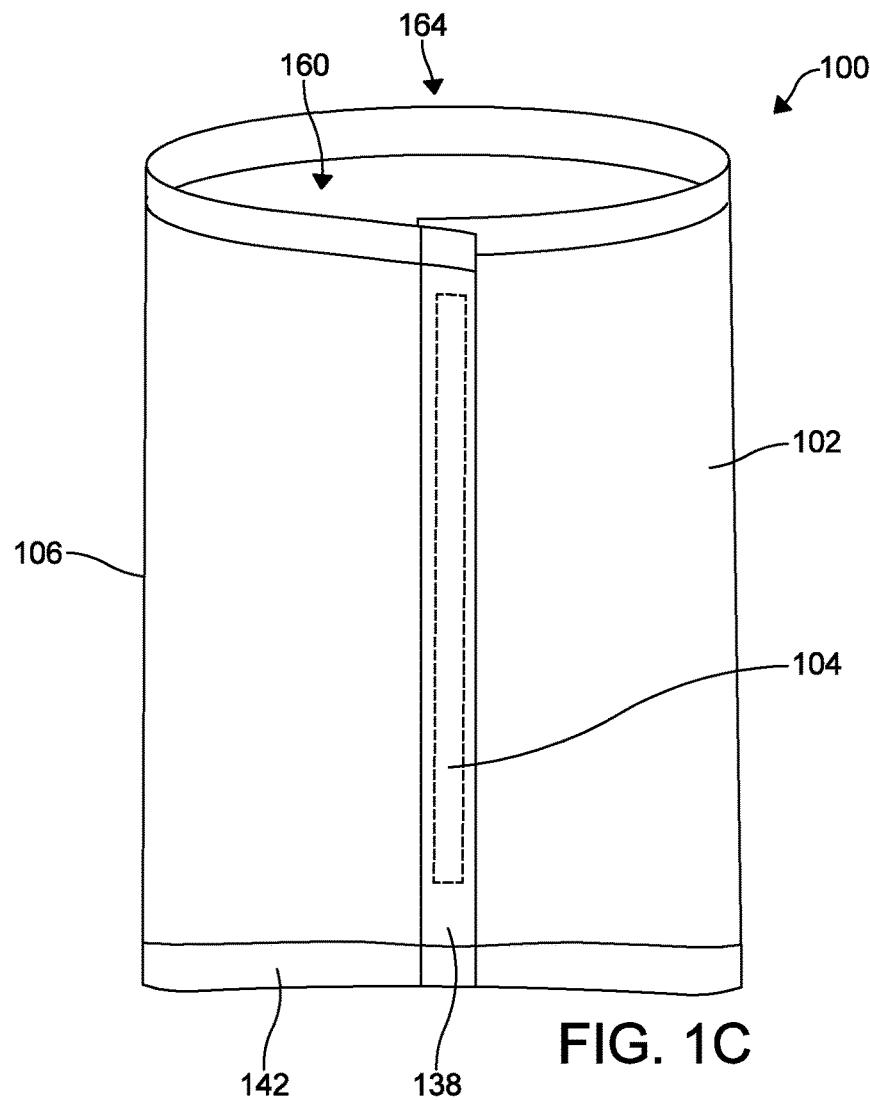
FIG. 1C is a rear perspective view of the resealable bag shown in FIG. 1A, the resealable bag in an unrolled and unsealed, open third position.
Figure 1D:
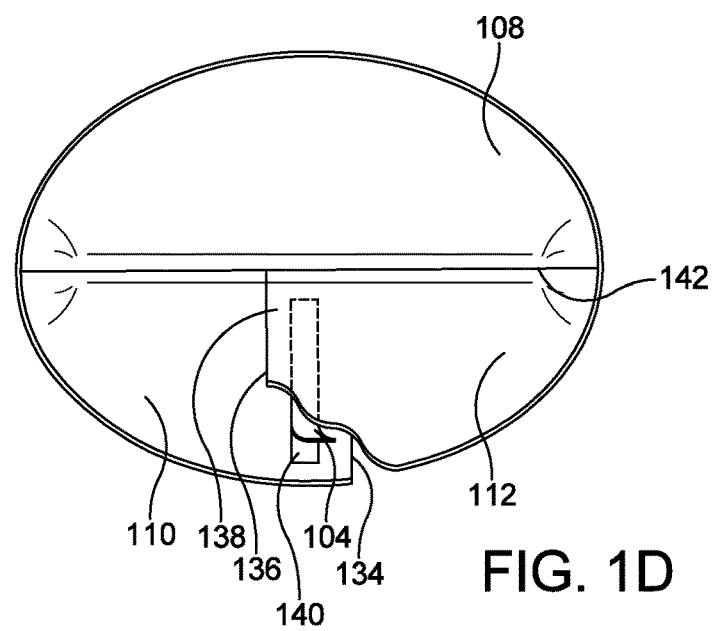
FIG. 1D is a top elevational view of the resealable bag shown in FIG. 1A, the resealable bag shown with a top section of a second end of the main body removed.

In a more particular embodiment, as shown in FIGS. 1D and 2, a first end 134 of the panel 106 may be adapted to overlap a second end 136 of the panel 106 to form a vertical seal 138. The main body 102 may also include a bottom seal 142 and a top seal 144. The panel 106, in combination with the vertical seal 138, bottom seal 142, and top seal 144, is adapted to keep the contents properly stored prior to the user breaking one or more of the seals 130, for example, the top seal 144. The flexible member 104 may be disposed on one or both of the first end 134 and the second end 136 of the panel 106. In certain embodiments, the flexible member 104 may be held in place once the vertical seal 138 is formed, for example, in a cavity 140 formed by the vertical seal 138. Alternatively, in certain embodiments, the flexible member 104 may be integral with or permanently or removably connected to one or both of the first end 134 and the second end 136 of the panel 106 before or when the vertical seal 138 is formed. A skilled artisan may use any suitable means for affixing and securing the flexible member 104 to the main body 102 of the resealable bag 100, as desired. As non-limiting examples, glue or any other adhesive or other bonding agent may be used. Alternatively, the flexible member 104 may be affixed to the outside of the vertical seal 138. In certain alternative embodiments, more than one flexible member 104 may be affixed to the inside or the outside of the vertical seal 138. In alternative embodiments, more than one flexible member 104 may be disposed across a length 146 of the resealable bag 100, as shown in FIGS. 5 and 6, a width 148 of the resealable bag 100, or within one or more seals 130 at the front, rear, top, bottom, or sides of the resealable bag 100.

In another embodiment of the present disclosure, with renewed reference to FIGS. 5 and 6, at least one flexible member 104 may be disposed between one or more layers 114 of the main body 102 of the resealable bag 100. In a more particular embodiment, the resealable bag 100 may have at least one flexible member 104 disposed between the inner layer 116 and the outer layer 118 such that the at least one flexible member 104 is sandwiched between at least the inner layer 116 and the outer layer 118. In certain embodiments, additional layers 114 may be disposed next to one or both of the inner layer 116 and the outer layer 118, as desired.

Any suitable number of flexible members 104 in any desired shape and size may be used. Likewise, any suitable material or combination of materials may be used for the flexible members 104. The flexible members 104 may be arranged in any desirable position or configuration, as determined by one of skill in the art. The desired end use of the resealable bag 100, the contents being stored, and the size and the material of the resealable bag 100, for example, may be used to determine the type, number, and configuration of the flexible members 104.

The at least one flexible member 104 may be held in place using glue or any other adhesive or other bonding agent, as non-limiting examples. In a more particular embodiment, the at least one flexible member 104 may be held in place by lamination between layers 114 of the main body 102 of the resealable bag 100. In certain embodiments, the at least one flexible member 104 may be disposed in one or more cavities (not shown) formed between layers 114 of the main body 102 of the resealable bag 100. The at least one flexible member 104 may be secured to the main body 102 of the resealable bag 100 using adhesive or lamination between two or more layers 114, one or more cavities or seals 130, or any combination of securing means. The at least one flexible member 104 may be integral with or permanently or removably connected to one or more layers 114 of the resealable bag 100. In certain embodiments where the at least one flexible member 104 is removably connected to the resealable bag 100, the at least one flexible member 104 may be positioned and repositioned by the user throughout the life of the resealable bag 100. In certain alternative embodiments, the at least one flexible member 104 may be affixed to the outside of the resealable bag 100 or the inside of the resealable bag 100.

The at least one flexible member 104 may be oriented vertically, horizontally, diagonally, or in any other suitable orientation, as well as any combination of suitable configurations, as determined by one of skill in the art. In certain embodiments, the at least one flexible member 104 may extend across the entire length 146 or the entire width 148 of the resealable bag 100. In other embodiments, the at least one flexible member 104 may extend from the top seal 144 to the bottom seal 142 of the resealable bag 100, as shown in FIG. 6, from the bottom seal 142 to the top of the resealable bag 100, as shown in FIG. 5, or any other desired length. In certain embodiments having multiple flexible members 104, the flexible members 104 may be identical to one another. In certain alternative embodiments having multiple flexible members 104, the flexible members 104 may have variable sizes, shapes, and configurations, and may also be made from the same or different material or materials.

In a more particular embodiment, the at least one flexible member 104 may be disposed in a sealant layer 128 of the main body 102. In yet another more particular embodiment, the at least one flexible member 104 may be embedded in a thermoplastic sheet layer 114.

Figure 7:
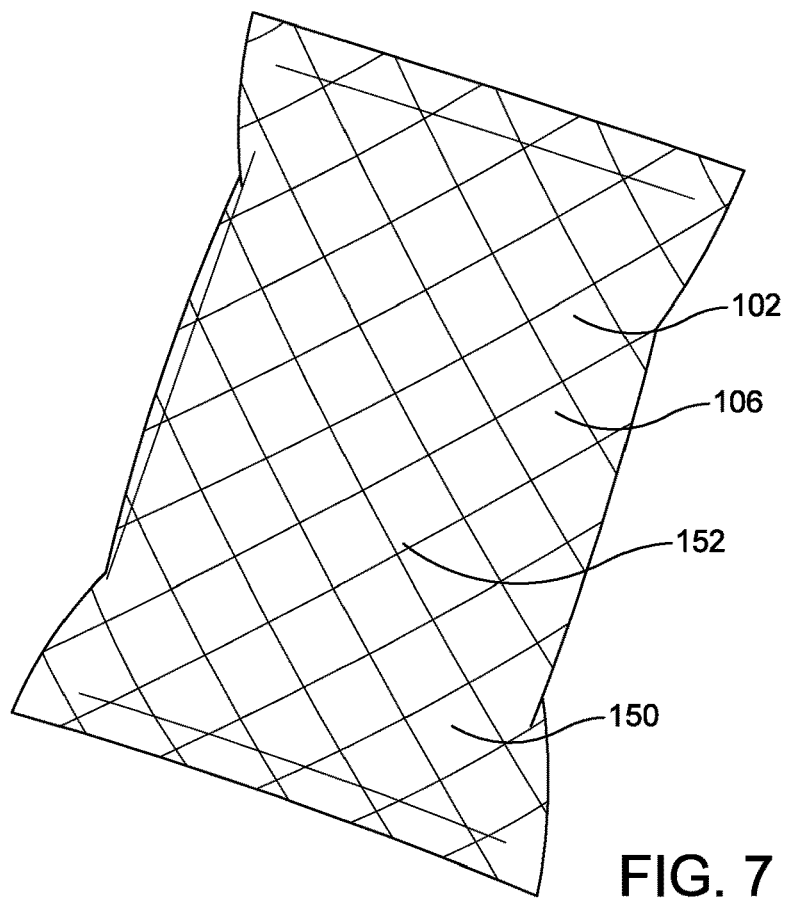
FIG. 7 is a front perspective view of a resealable bag according to another embodiment of the present disclosure.
Figure 8:
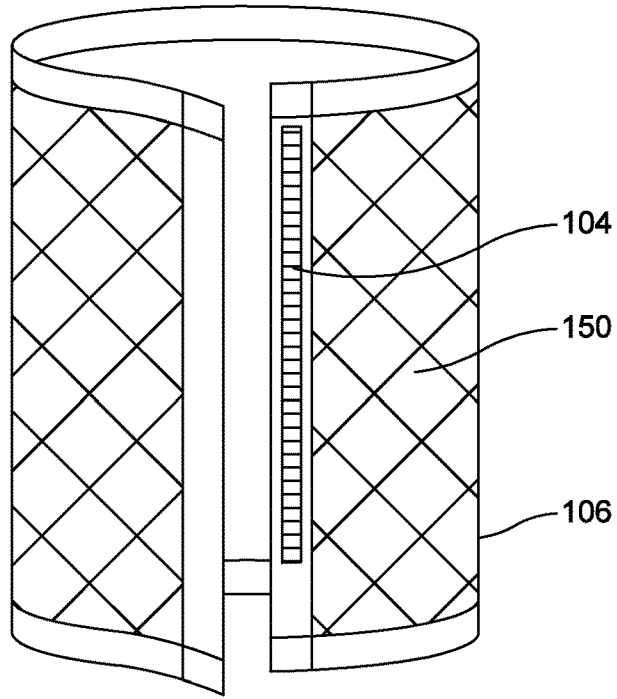
FIG. 8 is a rear perspective view of a panel of a resealable bag according to another embodiment of the present disclosure.
Figure 9:
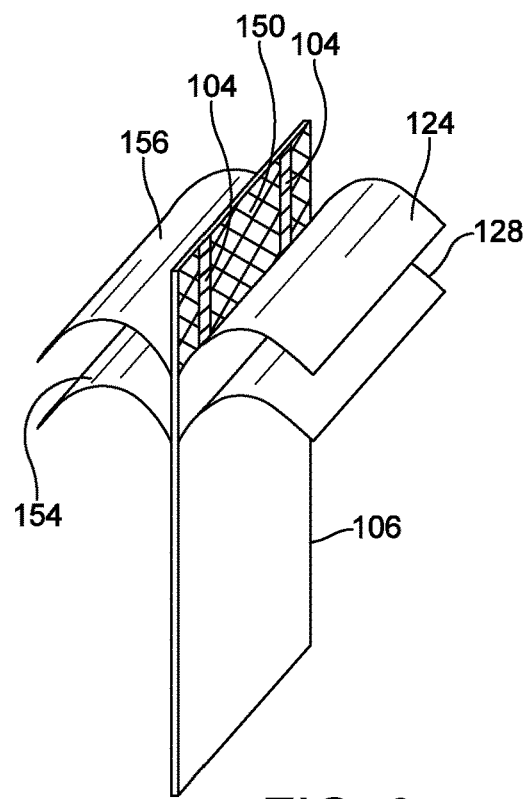
FIG. 9 is a side perspective view of a plurality of layers and two flexible members of a resealable bag according to another embodiment of the present disclosure.

In yet another more particular embodiment, the at least one flexible member 104 may be a flexible resealing layer 150 fabricated from one or more malleable materials. Accordingly, the resealing layer 150 may retain a shape upon being manipulated by the user. As one non-limiting example, aluminum foil may be used. The resealing layer 150 may be disposed between two or more layers 114. The resealing layer 150 may be the inner layer 116 of the resealable bag 100 or the outer layer 118 of the resealable bag 100, according to various embodiments of the present disclosure. In certain embodiments, the main body 102 may be fabricated using one layer 114, the resealing layer 150. The resealing layer 150 may be a sheet of thermoplastic material with at least one flexible member 104 embedded therein, according to various embodiments of the present disclosure. In certain alternative embodiments of the present disclosure, the resealing layer 150 may be a sealant layer 128 embedded with at least one flexible member 104. In certain embodiments, one or both of the resealing layer 150 and the at least one flexible member 104 may be in a diamond lattice pattern 152, for example, as shown in FIGS. 7-9. In certain alternative embodiments of the present disclosure, the resealing layer 150 may be a layer 114 of flexible material that may be embedded with at least one flexible member 104.

In certain embodiments, with reference to FIG. 9, the resealing layer 150 may be sandwiched between layers 114 of the main body 102. In a more particular embodiment, the resealing layer 150 may be disposed between a layer of BOPP 156 and a layer of LDPE 124. The resealing layer 150, the layer of BOPP 156, and the layer of LDPE 124 may be further sandwiched between a layer of Surlyn® 154 and a layer of MFT BOPP 126, as one non-limiting example of a main body 102. In yet another embodiment, a laminate aluminum foil may be applied to the panel 106 or a portion of the panel 106 such as the rear left panel section 110, the rear right panel section 112, or the front panel section 108, as non-limiting examples. It should be appreciated that any malleable material, in combination with other materials or alone, may be used to form a resealing layer 150 in the panel 106 or in a portion of the panel 106.

It should be appreciated that the resealing layer 150 may be disposed along the length 146 and the width 148 of the resealable bag 100. The resealing layer 150 may extend the entire length 146 and width 148 of the panel 106 that forms the main body 102 of the resealable bag 100, as shown in FIG. 7, or the resealing layer 150 may extend only a portion of the length 146 and the width 148 of the panel 106 that forms the main body 102 of the resealable bag 100. For example, the resealing layer 150 may be disposed spaced apart from a top and a bottom of the resealable bag 100, as shown in FIG. 8. It should be appreciated that the resealing layer 150 does not need to be disposed centrally along the length 146 or the width 148 of the resealable bag 100. In other words, the resealing layer 150 may be disposed nearer to the top of the resealable bag 100 than the bottom of the resealable bag 100, as it is not necessary to reseal the bottom of the resealable bag 100 according to certain embodiments of the present disclosure. As another non-limiting example, the resealing layer 150 may be disposed in only the front panel section 108 or any other panel section. A skilled artisan may select any suitable placement for the resealing layer 150, as desired.

In a more particular embodiment of the present disclosure, the resealable bag 100 includes a resealing layer 150 and at least one flexible member 104 disposed in the vertical seal 138 of the main body 102 of the resealable bag 100. In yet another more particular embodiment, the resealable bag 100 includes a resealing layer 150 with at least one flexible member 104 disposed or embedded on the resealing layer 150, as shown in FIG. 9.

In operation, the user may access the resealable bag 100 in a closed, un-opened first position 158. The user may open the resealable bag 100, breaking one or more of the seals 130, in order to gain access to the contents of the resealable bag 100 through an opening 160. After obtaining the desired contents from the resealable bag 100, the user may close the resealable bag 100 and store the contents of the resealable bag 100 for a period of time. To do so, the user may roll or fold the resealable bag 100 thereby closing the opening 160. The roll or fold positions the at least one flexible member 104 in the deformed shape 132. As described hereinabove, the at least one flexible member 104 maintains the deformed shape 132, thereby, holding the resealable bag 100 in a re-sealed, closed second position 162. To regain access to the contents of the resealable bag 100, the user may unroll or unfold the at least one flexible member 104 of the resealable bag 100, thereby placing the resealable bag 100 in an unrolled and unsealed, open third position 164, as shown in FIG. 1C, such that the user may gain access to the contents of the resealable bag 100 through the opening 160 again. The resealable bag 100 is selectively positionable between the unrolled and unsealed, open third position 164 and the re-sealed, closed second position 166. Accordingly, even where the resealable bag 100 is shaken, jostled, or flipped upside down, the at least one flexible member 104 will hold the resealable bag 100 in the re-sealed, closed second position 162, as desired. Advantageously, this militates against undesirable spills of the contents of the resealable bags 100, in operation, and removes any unused space in the resealable bag 100 during storage leaving a progressively smaller, neater resealable bag 100 for storage.

It should be appreciated that the resealable bag 100 may be repeatedly opened and closed, as desired. The flexible material of the at least one flexible member 104 allows for repeated deformations without a reduction in strength. Accordingly, the user may place the resealable bag 100 in the re-sealed, closed second position 162 at any level along the bag allowing the resealable bag 100 to be automatically sealed at any level. The at least one flexible member 104 allows the resealable bag 100 to be repeatedly sealed and unsealed as desired without the use of an additional closing or sealing mechanism. The resealable bag 100 may be roll-up, folded, and closed easily and quickly. In certain embodiments, at least one flexible member 104 may be positioned vertically, horizontally, or in any other suitable orientation and adaptable to any amount of contents within the resealable bag 100. The resealable bag 100 may be sealed at any level. The at least one flexible member 104 may allow the resealable bag 100 to be "self-locking," such that no additional clip or tie is needed to reseal and keep the resealable bag 100 closed.

In certain embodiments, the at least one flexible member 104 may be cut or torn by the user. In other words, the user may remove a desired portion of the resealable bag 100 in order to more easily access to the contents of the resealable bag 100. Even where the at least one flexible member 104 has been cut or torn, the user may still roll the resealable bag 100 into the re-sealed, closed second position 162. Advantageously, the user may remove extra packaging that may take up additional space or impede access to the contents of the resealable bag 100 without hindering the sealing capabilities of the resealable bag 100.

Figure 10:
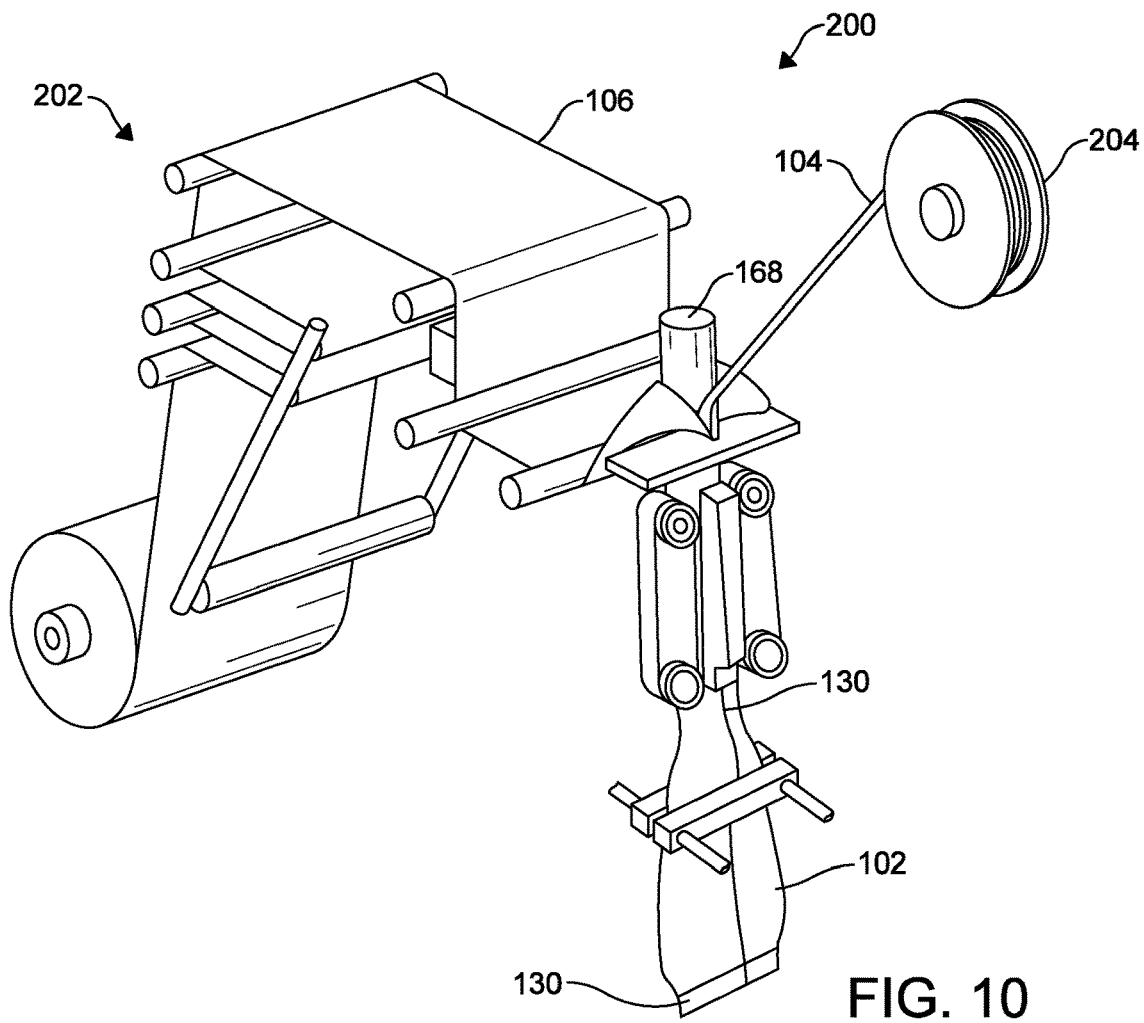
FIG. 10 is a side perspective view of a system for making a resealable bag according to another embodiment of the present disclosure.

In yet another embodiment, a system 200 and method for manufacturing the resealable bag 100, as shown in FIG. 10, may include an automated machine 202. As non-limiting examples, a form fill sealing machine, a vertical form fill sealing machine, a horizontal form fill sealing machine, or any other pipe driven or other suitable machine may be used to form the main body 102 of the resealable bag 100. The resealable bag 100 may have various configurations such as pillow, gusset, box bottom, or pouch, as non-limiting examples. The system 200 may also include a spool 204 or other device suitable for delivering or dispensing the at least one flexible member in communication with the automated machine 202. The spool 204 may include at least one flexible member 104 that is directly fed into a seal 130 formed in the main body 102 of the resealable bag 100 by the automated machine 202. The spool 204 may be in electrical communication with a control unit (not shown), and the spool 204 and the control unit may be designed and retrofitted to a vertical form fill sealing machine, a horizontal form fill sealing machine, or any other suitable automated machine 202, per individual machine schematics, as desired. In certain embodiments, any suitable applicator or retrofitted component may be added to or included with the automated machine 202. It should be appreciated that any suitable automated machine 202 used to manufacture a resealable bag 100 and any suitable mechanism for delivering the at least one flexible member 104 to the automated machine 202 may be used. In certain embodiments, more than one spool 204 and more than one flexible member 104 may be used with the automated machine 202.

In certain more particular embodiments of the present disclosure, a direct vertical feed of the at least one flexible member 104 to a fin, lap, or other seal 130 may be either continuous or registered, as non-limiting examples. The system 200 and method may be used on all sealant-type applications. It should be appreciated that the system 200 and method is not necessarily machine-dependent, and any suitable machine that produces a resealable bag 100 having one or more seals 130, cavities, adhesives, or other means for connecting to the at least one flexible member 104 may also be employed. In particular, any suitable automated machine 202 creating a seal 130 in combination with any suitable means for feeding the at least one flexible member 104 into the seal 130, in any direction, as desired, may be used within the scope of the present disclosure. In another more particular embodiment, the spool 204 may directly feed the at least one flexible member 104 between two or more layers 114 of the main body 102 of the resealable bag 100 prior to any seals 130 being formed such that the at least one flexible member is disposed between, embedded in laminated between, or otherwise secured between at least two layers 114 of the resealable bag 100.

Figure 11:
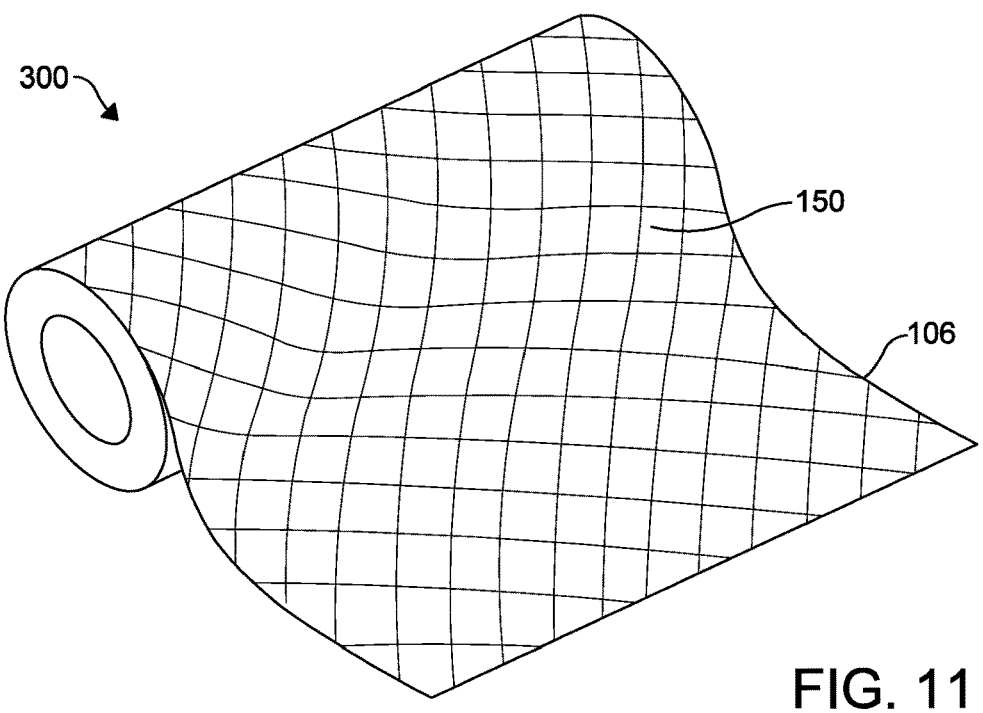
FIG. 11 is a side perspective view of a resealing layer of a resealable bag according to another embodiment of the present disclosure.
Figure 15:
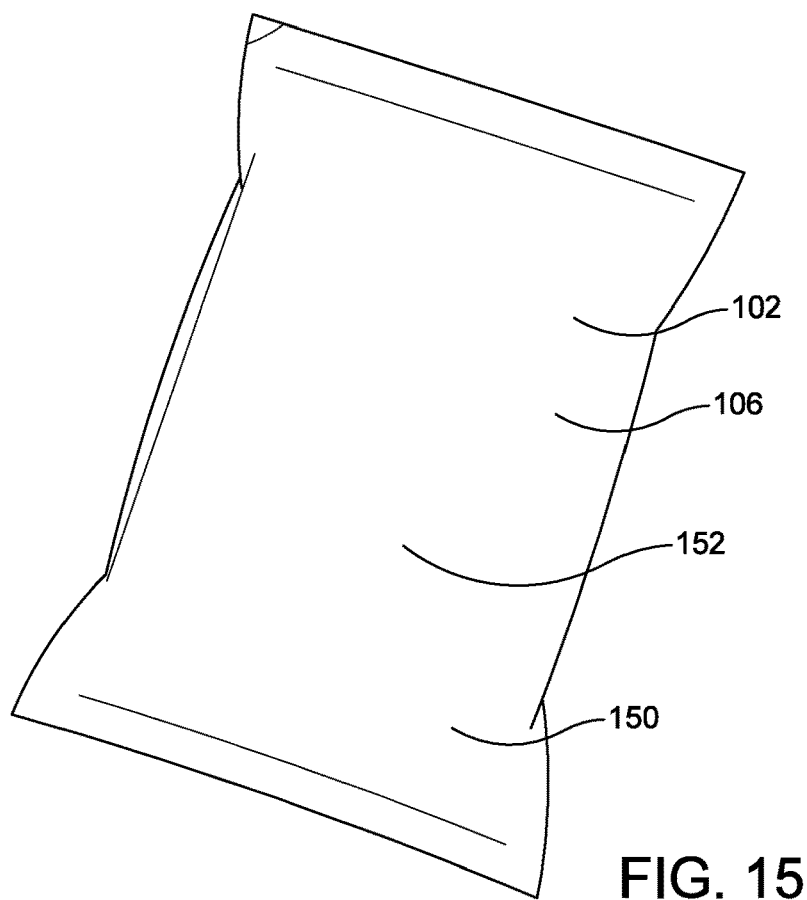
FIG. 15 is a front perspective view of a resealable bag according to yet another embodiment of the present disclosure.

In another more particular embodiment of the present disclosure, a system (not shown) may include an automated machine 202 used to form the main body 102 of the resealable bag 100 and a roll 300 of flexible material, as shown in FIG. 11, used to form the panel 106 that is formed into the main body 102 of the resealable bag 100. In certain embodiments, the roll 300 of flexible material used to form the panel 106 may include more than one layer, and the at least one flexible member 104 may be disposed on or in between one or more of the layers 114 that make up the panel 106 of the resealable bag 100. In certain alternative embodiments, the roll 300 of flexible material used to make the panel 106 may include a flexible resealing layer 150 fabricated from one or more malleable materials. As one non-limiting example, aluminum foil may be used. The resealing layer 150 may be disposed between two or more layers 114 included in the panel 106. The resealing layer 150 may be the inner layer 116 of the resealable bag 100 or the outer layer 118 of the resealable bag 100, according to various embodiments of the present disclosure. In certain embodiments, the main body 102 may be fabricated from a single layer 114 that is the resealing layer 150. The resealing layer 150 may be a sheet of thermoplastic material with at least one flexible member 104 embedded therein, according to various embodiments of the present disclosure. In certain alternative embodiments, the resealing layer 150 may be a sealant layer 128 with at least one flexible member 104 disposed or embedded on the sealant layer 128.

The roll 300 of flexible material used to form the panel 106 may be automatically fed into the automated machine 202 and around a tube 168, for example, a cone-shaped tube 168, as a non-limiting example. The tube 168 may then form the main body 102 of the resealable bag 100 by wrapping the panel 106 around the tube 168 and forming the necessary seals 130. Prior to forming a final seal 130, the contents may be distributed into the resealable bag 100. In certain embodiments, the roll 300 of flexible material used to form the panel may be used in the system 200 and method for manufacturing the resealable bag 100 shown in FIG. 10. Accordingly, in certain more particular embodiments, the resealable bag 100 may include both a resealing layer 150 and at least one flexible member 104 disposed in a seal 130 disposed on the main body 102 of the resealable bag 100, as shown in FIG. 8.

In another embodiment of the present disclosure, a system (not shown) for manufacturing a resealable bag 100 includes a dispensing mechanism for a panel 106 of flexible material and an automated machine 202 for forming the panel 106 of flexible material into a resealable bag 100. It should be appreciated that the dispensing mechanism, according to certain embodiments, may produce the panel 106 of flexible material having a flexible member 104 that is one of attached to the flexible material of the panel 106, disposed on the flexible material of the panel 106, and embedded in the flexible material of the panel 106. Alternatively, the panel 106 of flexible material may be premanufactured to include the flexible member 104 that is one of attached to the flexible material of the panel 106, disposed on the flexible material of the panel 106, and embedded in the flexible material of the panel 106. In another embodiment of the present disclosure, a spool 204 or any other suitable dispensing mechanism may be included in the system for manufacturing a resealable bag 100. The spool 204 is adapted to dispense the flexible member 104 such that the flexible member 104 is one of attached to the flexible material of the panel 106, disposed on the flexible material of the panel 106, and embedded in the flexible material of the panel 106 when the panel 106 of flexible material is formed into the resealable bag 100 by the automated machine 202.

With reference to FIGS. 12-14, a method 400 of making a resealable bag 100, according to various embodiments, is shown. The method 400 of making the resealable bag 100 includes a first step 402 of providing a panel 106 of flexible material. The method 400 further includes a second step 404 of manipulating the panel 106 into a resealable bag 100. It should be appreciated that the first step 402 of providing the panel 106 of flexible material may be accomplished by a step 401 of either manufacturing the panel 106 by one of attaching a flexible member 104 to the flexible material of the panel 106, disposing the flexible member 104 on the flexible material of the panel 106, and embedding the flexible member 104 in the flexible material of the panel 106, or by obtaining the panel 106 of flexible material premanufactured with the flexible member 104 one of attached to the flexible material of the panel 106, disposed on the flexible material of the panel 106, and embedded in the flexible material of the panel 106. In either case, attaching the flexible member 104 to the panel 106, disposing the flexible member 104 on the panel 106, and embedding the flexible member 104 in the panel 106 may be accomplished by various means including, but not limited to, employment of the system 200 as described herein. It should be appreciated that the flexible member 104 may be installed on or in the resealable bag 100 during the second step 404 while the panel 106 of flexible material is being manipulated to form the resealable bag 100. In certain embodiments, the second step 404 may include a step 405 of one of attaching the flexible member 104 to the flexible material of the panel 106, disposing the flexible member 104 on the flexible material of the panel 106, and embedding the flexible member 104 in the flexible material of the panel 106 during formation of the resealable bag 100.

In yet a further embodiment, for example, as shown in FIGS. 15-20, the main body 102 of the resealable bag 100 may be formed from a panel 106 having a resealing layer 150. The resealable bag 100 is selectively positionable between an open, unsealed position, and a closed, sealed position. When the resealable bag is in the closed, sealed position, the resealing layer 150 is in a deformed shape. The resealable bag 100 is formed of nonmetallic materials. In certain embodiments, the resealing layer 150 may be formed from an inelastic deformable polymer 170. Additionally, the resealing layer 150 may not include any metal. It should be appreciated that the absence of metal may be important for recyclability of the resealable hag 100. In particular, since resealable bag 100 is formed of nonmetallic materials, all of the components may be processed together by a recycling facility, or composted, as desired.

It should be appreciated that the resealable bag 100, as defined herein, may also be provided in the form of a bag, a pouch, or any other sealable, polymers, materials, and container suitable for storage of food stuffs known to those of skill in the art including, as non-limiting examples: stand up pouches; gusted pouches including a side gusset, bottom gusset, and combinations thereof; pillow pouches; three-side seal pouches; liquid pouch packaging; flat bottom bags; flat barrier bags; spouted pouches; flat bottom-flexible box bags; rollstock; kraft pouches; vacuum pouches; window pouches; zipper pouches; paper pouches; standcap inverted pouches; wicket pouches; heat seal pouches; retort pouches; fitment pouches; narrow web flexible packaging; and combinations thereof. Flexible polymer films as well as paper bags such as "sandwich bags" incorporating the inelastic deformable polymer are also contemplated. One of ordinary skill in the art may select suitable structures for the reasonable bag 100 within the scope of the present disclosure.

In an exemplary embodiment, the inelastic deformable polymer 170 may be formed by combining into an admixture a vegetable oil, a chain extender, a biodegradable polymer, and a crosslinking agent. For example, the combination of these ingredients may be mixed at about 50° C. for about 5 minutes to form an intermediate product. The intermediate product may then be cured. For example, the curing may take place at about 80° C. for about 7 days. Other suitable mixing and curing conditions for the inelastic deformable polymer 170 of the present disclosure may also be employed by a skilled artisan, as desired.

In other examples, the inelastic deformable polymer 170 may be cast into a tray with a desired thickness prior to curing. In further examples, the inelastic deformable polymer 170 may be exposed to a combination of pressure and/or weight, for example, in order to facilitate casting the inelastic deformable polymer 170. In more specific examples, the inelastic deformable polymer 170 may be cured more quickly using a rotary evaporator. In other examples, the inelastic deformable polymer 170 may be subjected to heat and/or a vacuum during the curing process. In certain examples, the inelastic deformable polymer 170 may be formed into a resealing layer 150 with a thickness between about 5 microns to about 2.0 millimeters. In more specific embodiments, the inelastic deformable polymer 170 may be formed into a resealing layer 150 with a thickness between about 25 microns to about 1.0 millimeters. A skilled artisan may also employ other suitable manufacturing methods for the formation of the inelastic deformable polymer 170 into the suitable layer or laminate, as well as other suitable thicknesses of the inelastic deformable polymer 170, within the scope of the present disclosure.

It should be appreciated that the inelastic deformable polymer 170 may be light, easy to manipulate, and exhibit shape fixity. The term "shape fixity" is defined herein as a property of a material which enables the material to retain a deformed shape. In certain embodiments the shape fixity is inverse to the shape recovery of the inelastic defoiinable polymer 170, with the shape recovery preferably being either completely, or nearly, nonexistent. The inelastic deformable polymer 170 is able to be reshaped and maintain the deformed shape, allowing the resealable bag 100 to be opened and closed by the user via a manual rolling or folding the resealing layer 150 of the resealable bag 100.

In particular embodiments, shape fixity may be affected by high temperatures which may break down the inelastic deformable polymer 170. In more particular embodiments, the shape fixity is selected for the inelastic deformable polymer 170 so that there is substantially no shape recovery of the inelastic deformable polymer 170 at temperatures below 50° C. In a most particular embodiment, the inelastic deformable polymer 170 may continue to exhibit shape fixity at temperatures below 80° C. Although these particular shape fixity characteristics for the inelastic deformable polymer 170 are believed to be especially suitable, other suitable shape fixity characteristics may also be selected by one skilled in the art within the scope of the present disclosure.

As described hereinabove, the inelastic deformable polymer 170 may be deformed and fixed into a temporary shape, and then returned to the original shape. The polymer may be formed from various suitable materials known to those of skill in the art including as non-limiting examples, certain oils, biodegradable polymers, chain extenders, and crosslinking agents.

In certain embodiments, the polymer may be formed from oils, such as vegetable oils including but not limited to: Avocado; Brazil nut; Canola; Coconut; Corn; Cottonseed; Castor; Flaxseed/linseed; Grape seed; Hemp seed; Olive; Palm; Peanut; Rice bran oil; High-oleic safflower oil; Sesame; Soybean; Walnut oil; Sunflower; Cottonseed; Palm; and combinations thereof. Other suitable amounts and types of oils may also be employed, as desired.

In particular embodiments, the polymer may be formed from biodegradable polymers including: Albumin; Alginate; Carrageenan; Casein; Chitosan; Collagen; Gelatin; Guar gum; Hyaluronan; Pectins; Poly (33-hydroxybutyric acid); Poly (adipic acid); Poly (dioxanone); Poly (lactic-coglycolic acid); Poly (sebacic acid); Poly(caprolactone); Poly(L-lactic acid); Polyamides; Polyanhydride; Polyester-amides; Polyglycolic acid; Polyorthoesters; Polyphosphoester; Polyols; Polyposphazenes; Starch; Whey; Cellulose; and combinations thereof. Other suitable types and amounts of biodegradable polymers may also be selected by a skilled artisan within the scope of the present disclosure.

In yet other embodiments, the chain extenders may include: Ethylene glycol; Diethylene glycol; Propylene glycol; Dipropylene glycol; 1,4 Butanediol; 2-Methyl-1,3-propylene diol; N,-Bis(2-hydroxypropylaniline); Water; 1,4-Di (2-hydroxyethyl)hydroquinone; Diethanolamine; Triethanolamine; 1,1,1-Trimethylol propane; Glycerol; Dimethylol butanoic acid (DMBA); Hydrazine; Ethylene diamine (EDA); 1,4-Cyclohexane diamine; Isophorone diamine; 4,4'-Bis(sec-butylamine)dicyclohexylmethane; 4,4'-Bis(sec-butylamine)diphenylmethane; Diethyltoluene diamine; 4,4'-Methylene bis(2-chloroaniline); 4-Chloro-3,5-diamino-benzoic acid isobutylester; 3,5-Dimethylthio-toluene diamine; Trimethylene glycol-di-p-aminobenzoate; 4,4'-Methylene bis(3-chloro-2,6-diethylaniline); 1-(-Naphthyl)-3,3-di(2-hydroxyethyl)-triazene-1; 1-Phenyl-3,3-di(2-hydroxyethyl)-triazene-1PT-D; and combinations thereof. Additional amounts and types of the chain extenders may also be selected by one of ordinary skill in the art, as desired.

In yet further embodiments, the crosslinking agents may include: 1-ethyl-3-(3-dimethylaminopropyl)carbodiimide; Calcium chloride; Citric acid; Dextran dialdehyde; Epichlorohydrin; Genipin; Glutaraldehyde; Glyoxal; Hexamethylene diisocyanate (HDI); Isophorone diisocyanate (IPDI); Methyl isocyanate (MIC); Methylenebis(phenyl isocyanate) (MDI) N-hydroxysuccinimide (NHS); Naphthalene diisocyanate (NDI); Octylamine; SODIUM TRIMETAPHOSPHATE; Tannic acid; Toluene-2,4-diisocyanate (TDI); Tri polyphosphate; and combinations thereof. One skilled in the art may also select other suitable types and amounts of cross linking agents.

It should also be appreciated that the methods for preparing the inelastic deformable polymer 170 may also use other ingredients such as polymer raw materials, solvents, and polymerization precursors, as non-limiting examples. A skilled artisan may select the amounts and types of these other polymer raw materials, solvents, and polymerization precursors within the scope of the present disclosure In one non-limiting example, the inelastic deformable polymer 170 may be provided as a shape memory polymer, although it should be appreciated that suitable types of the inelastic deformable polymer 170 are not limited to shape memory polymers.

Figure 19:
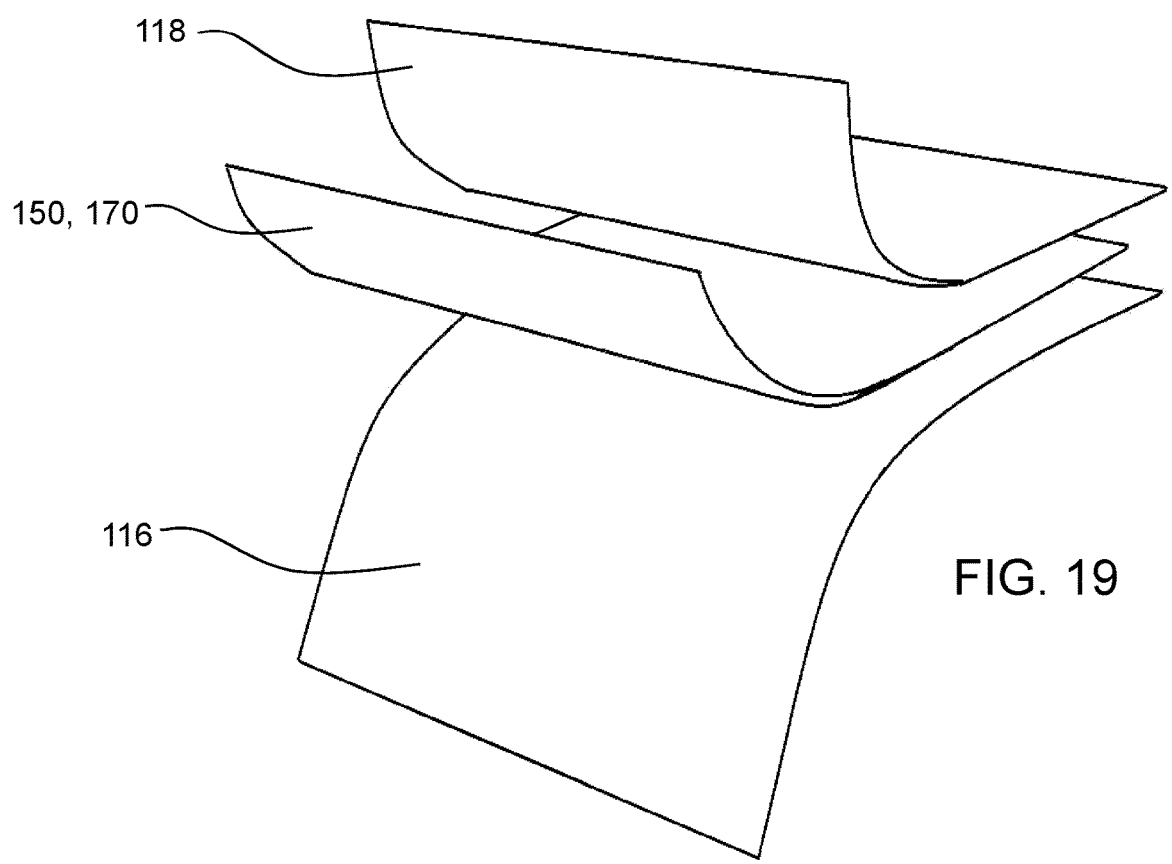
FIG. 19 is a side perspective view of three layers of a resealable and rollable bag according to yet another embodiment of the present disclosure, with one of the layers being an inelastic deformable polymer layer.

In certain embodiments, the inelastic deformable polymer 170 may also be configured to operate as a barrier for grease, oxygen, and moisture. In a particular embodiment, for example, as shown in FIG. 19, the inelastic deformable polymer 170 may be used as the inner layer 116 and adapted to come into contact with food stuffs. In other embodiments, for example, as also shown in FIG. 19, the inelastic deformable polymer 170 may also be employed as an outer layer 118, thereby allowing the inelastic deformable polymer 170 to be printed on for packaging and aesthetic appeal. In yet another embodiment, the inelastic deformable polymer 170 may be employed as the resealing layer 150, with other suitable types of materials employed as the inner layer 116 and functioning as the grease barrier, and the outer layer 118 and functioning as a printable surface for marketing and advertising.

Figure 18:
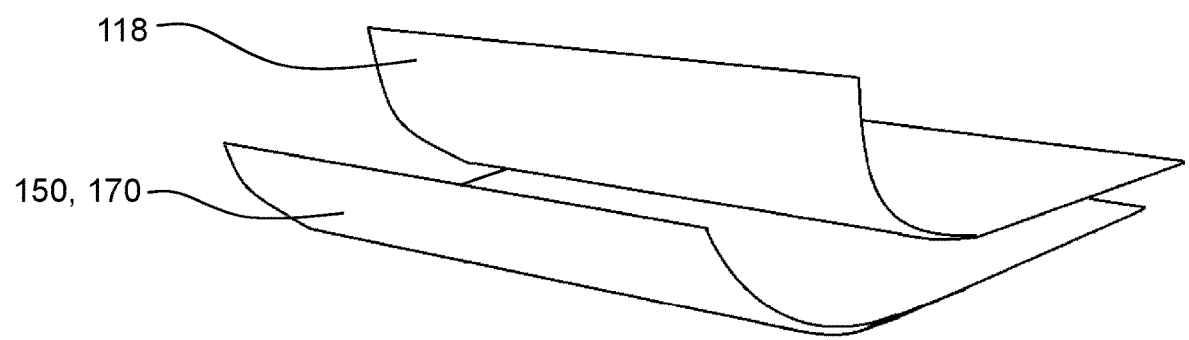
FIG. 18 is a side perspective view of two layers of a resealable and rollable bag according to another embodiment of the present disclosure, with one of the layers being an inelastic deformable polymer layer.

With reference to FIG. 18, in a particular example the resealing layer 150 may be combined with an outer layer 118, which together may be used to form the resealable and rollable bag 100. The outer layer 118 may be especially configured to accept and retain printing thereon. The outer layer 118 may be formed out of a biodegradable film. In certain embodiments, the outer layer 118 is compostable. In particular embodiments, the outer layer 118 may be fossil fuel-based, bio-based, or combinations thereof. In a more particular embodiment, the outer layer 118 may be formed from compostable biodegradable film, such as a compostable polymeric film or laminate commercially available from TIPA Corp Ltd. based in Israel. Other suitable types of the outer layer 118 configured to accept and retain printing thereon may also be employed within the scope of the present disclosure.

In certain embodiments, the main body 102 of the resealable bag 100 may be formed from the panel 106 having the resealing layer 150 and the outer layer 118. The resealing layer 150 may be laminated with the outer layer 118 in such case, for example, with at least one of heat and pressure, so as to be generally inseparable from one another in operation.

With reference to FIG. 19, the panel 106 employed to form the resealable bag 100 may further include the inner layer 116. Accordingly, the inelastic deformable polymer 170 may be combined with the inner layer 116. The inner layer 116 may be laminated with, affixed to, or applied to inelastic deformable polymer 170 by any conventional means. In some embodiments, the inner layer 116 may be a recyclable barrier. In certain embodiments, the inner layer 116 may be a recyclable barrier coating that protects packaged products from one or more of the following: water; oxygen; oil; and grease. In particular embodiments, the inner layer 116 may be compostable. In a more particular embodiment, the inner layer 116 may be a plant-sourced barrier coating. In a most particular embodiment, the inner layer 116 may be a cellulose-based barrier coating derived from wood pulp. The inner layer 116 may be formed from recyclable barrier coating material, commercially available from Melodea Ltd, based in Israel, as a non-limiting example. Other suitable types of the inner layer 116 configured to act as a barrier to water, oxygen, oil, and/or grease may also be employed within the scope of the present disclosure.

With continued reference to FIG. 19, the resealing layer 150 may be secured between the inner layer 116 and the outer layer 118. In further examples, the resealing layer 150 may be laminated between the inner layer 116, and the outer layer 118. The main body 102 may be formed from the resealing layer 150, the inner layer 116, the outer layer 118, and combinations thereof.

In most particular embodiments, it should be understood that the resealing layer 150 may include the inelastic deformable polymer 170 only, without the presence of any metal layers or strips. Additionally, when forming the resealable bag 100, the the resealing layer 150 may extend a entire length and/or an entire width of the main body 102 of the resealable bag 100. These particular characteristics of the resealing layer 150 are considered advantageous as it permits for both recyclability and also the manual deformation by the user at any part of the resealable bag 100, which can pei suit for efficient elimination of air from the interior of the resealable bag 100 and longer expected shelf-life for food stuffs contained by the resealable bag 100.

In particular, it should be appreciated that the resealable bag 100 may be selectively positionable between an open unsealed position 158 (shown, generally, in FIG. 1A), and a re-sealed, closed second position 162 (shown, generally, in FIG. 1B). When the resealable bag 100 is in the closed, sealed position, the resealing layer 150 is in a deformed shape. This allows the user to close the resealable bag 100 and store the contents of the resealable bag 100 for a period of time. To regain access to the contents of the resealable bag 100, the user may unroll or unfold the resealing layer 150 of the resealable bag 100, thereby placing the resealable bag 100 in an unrolled and unsealed, open third position 164, as shown in FIG. 1C, such that the user may gain access to the contents of the resealable bag 100 through the opening 160 again. The user may also cut the bag at desire length to remove some of the excess bag and continue with the unroll or unfold the resealing layer. The resealable bag 100 is selectively positionable between the unrolled and unsealed, open third position 164 and the re-sealed, closed second position 162. Accordingly, even where the resealable bag 100 is shaken, jostled, or flipped upside down, the inelastic deformable polymer 170 in the resealing layer 150 will hold the resealable bag 100 in the re-sealed, closed second position 162, as desired. Advantageously, this militates against undesirable spills of the contents of the resealable bags 100, in operation, and removes any unused space in the resealable bag 100 during storage leaving a progressively smaller, neater resealable bag 100 for storage and longer shelf-life.

Figures 16, 17:
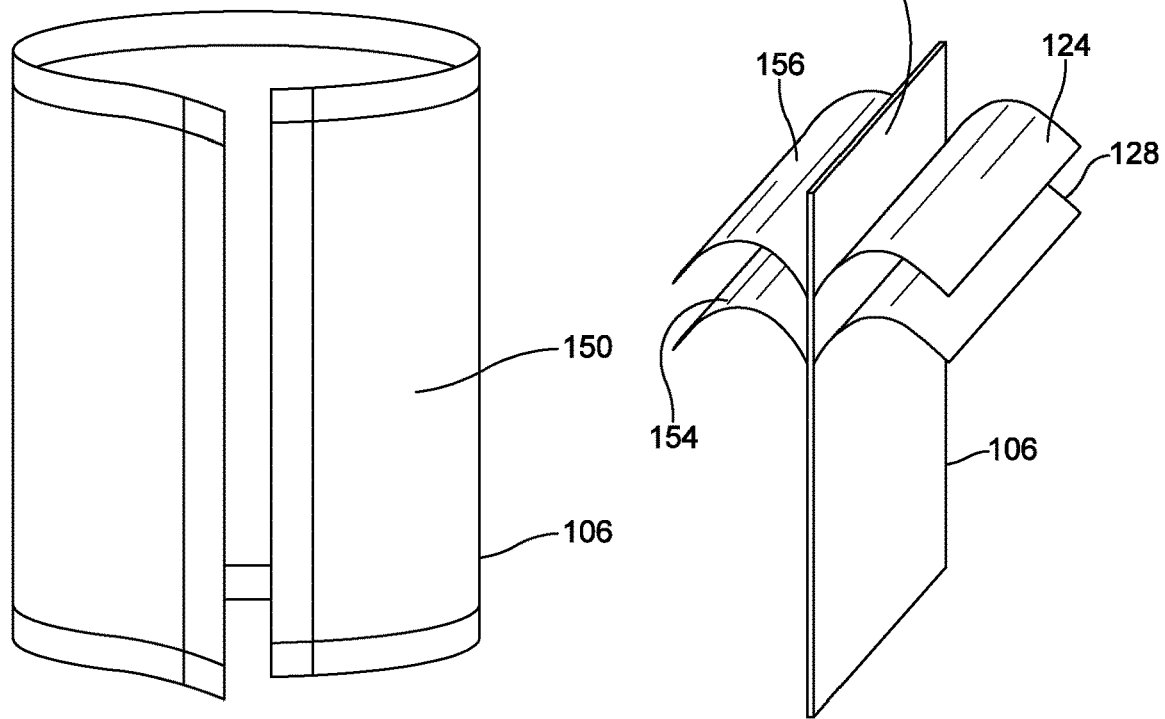
FIG. 16 is a rear perspective view of a panel of a resealable bag according to yet another embodiment of the present disclosure.
FIG. 17 is a side perspective view of a plurality of layers including an inelastic deformable polymer layer for a resealable and rollable bag according to yet another embodiment of the present disclosure.

The resealable bag 100 may especially be formed of nonmetallic materials, as described hereinabove, which is important for recyclability. As illustrated in FIG. 17, in one particular example the resealing layer 150 may be laminated with the inner layer, the outer layer, and the sealant layer. The resealing layer 150 may be laminated with the inner layer, the outer layer, and two sealant layers. The sealant layers may include sealant layer 128 and Surlyn™ 154, as a non-limiting example. Other suitable types of materials for the sealant layers 128 may also be used within the scope of the disclosure.

In certain embodiments, as shown generally in FIG. 3, the panel 106 may include a plurality of layers 114. Suitable materials may include, but are not limited to diaplex, thermoplastic polyurethane, thermoresponsive polyurethane (PU), sealant, thermoplastic resins such as biaxially oriented polypropylene (BOPP) and low-density polyethylene (LDPE), paper, synthetic paper, overprint varnish (OPV), plastic, polymer films, cellulosic film, bioplastic film, polypropylene fabric, Surlyn®, and any other suitable material. In particular embodiments, the resealing layer 150 may be a sheet, layer, or laminate of the inelastic deformable polymer 170.

In other embodiments, as shown in FIG. 17, the resealing layer 150 may extend from the top seal 144 to the bottom seal 142 of the resealable bag 100, from the bottom seal 142 to the top of the resealable bag 100, or any other desired length. In other embodiments, the resealing layer 150 may extend from a bottom end of the resealable bag 100 to the top end of the resealable bag 100. The main body 102 may be formed from a resealing layer 150 having a first end that overlaps a second end to form a vertical seal. The resealing layer 150 may extend a length and a width of the main body 102 of the resealable bag 100.

In a more particular embodiment, with renewed reference to FIG. 3, the main body 102 may include a layer of OPV varnish 120, a layer of synthetic paper 122, a layer of LDPE 124, a layer of MET BOPP 126, and a layer of sealant 128, as non-limiting examples. With reference to FIGS. 9 and 17, the panel may include a layer of plastic film, a layer of BOPP 156, the resealing layer 150 including the inelastic deformable polymer 170, a layer of LDPE 124, and a sealant layer 128, as non-limiting examples. Any suitable number and combination of layers 114 may be selected to form the panel 106, as desired, using any suitable materials.

Figure 20:
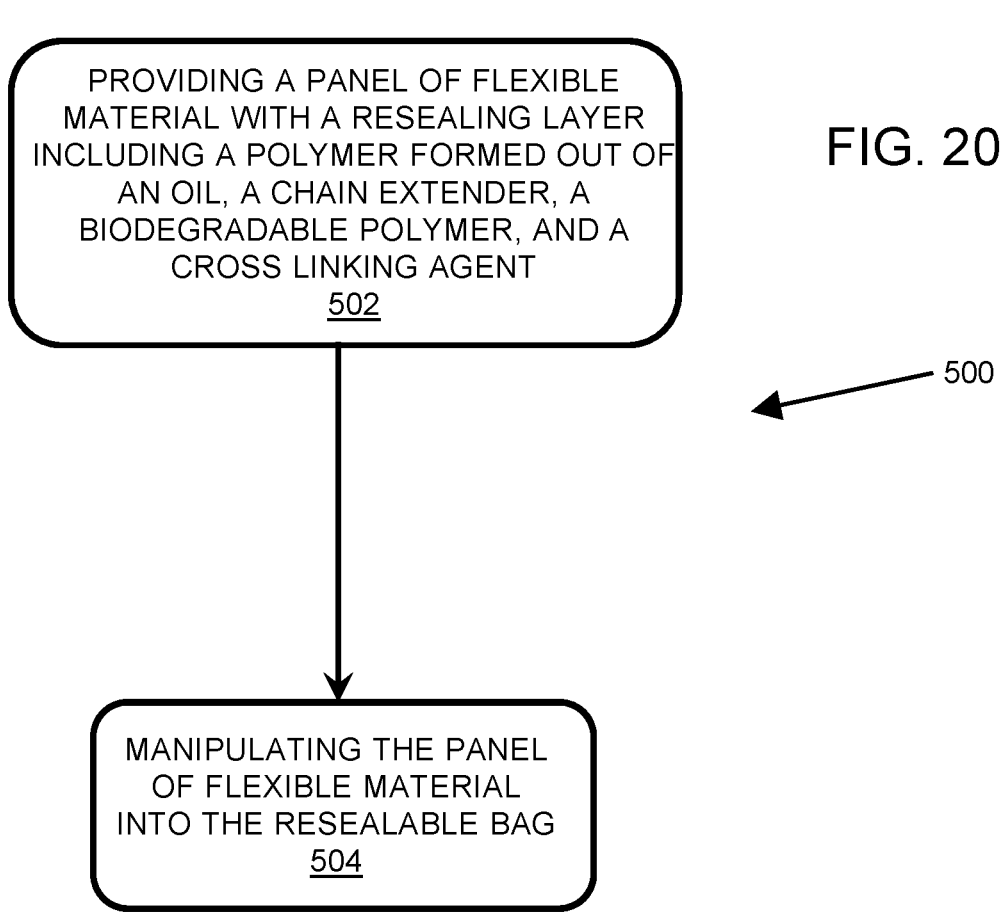
FIG. 20 is a method of making a resealable and rollable bag according to another embodiment of the present disclosure.

With reference to FIG. 20, a method 500 of manufacturing a resealable bag 100 includes a step 502 of providing a panel 106 of flexible material with a resealing layer 150 including an inelastic deformable polymer 170. The resealing layer 150 may be formed from an oil, a chain extender, a biodegradable polymer, and a cross linking agent, as described herein. The next step 504 includes manipulating the panel 106 of flexible material into the resealing bag 100, for example, using a mechanical bag-manufacturing process as described and shown herein. For example, a film extrusion manufacture process company may be used once the inelastic deformable polymer 170 is completed and put on a spool then shipped to a convertor for lamination. A laminating manufacture process may also be employed, for example, aprocess involving pushing molten polymer through a circular or slot die. This continuous process enables the production of a consistent high quality product to extremely accurate gauge. For most thin gauge films, the film extrusion process takes the form of blown or cast extrusion. One of ordinary skill in the art may select suitable mechanical bag-manufacturing processes with the scope of the present disclosure.

It should be appreciated that any other suitable constructions, systems, and methods for manufacturing the resealable bag 100 are contemplated and considered within the scope of the present disclosure.

Experimental

In certain non-limiting examples, the inelastic deformable polymer 170 may also be synethized with 3520 Diaplex, available from SMP Technologies located in Tokyo, Japan, and Dimethyl formamide (DMF), available from Millipore Sigma located in Missouri. The raw material polymers required to create the inelastic deformable polymer 170 are also commercially available. For example, polymerization precursors such as Castor Oil, are available from Amazon located in Washington, along with Polyethylene glycol (PEG) 1500, 1,4 Butadediol (BDO), and 1,6-Hexamethylene diisocyanate (HDI) are available from Millipore Sigma located in Missouri.

In particular, the inelastic deformable polymer 170 of the present disclosure may be formed by combining about 30 grams of polymer, such as MM 3520 from Diaplex SMP Technologies Inc to 70 grams of Dimethyl formamide (DMF). The inelastic deformable polymer 170 can be added to the DMF and stirred to allow complete solubilization of the inelastic deformable polymer 170. The inelastic deformable polymer 170 may then be cast in a tray with a desired thickness and dried using drying conditions. Once dry, the thin film can be removed from the tray surface.

In another non-limiting example, synthesizing an inelastic deformable polymer 170 for food packaging may be accomplished with about 70 grams of polyethylene glycol (PEG) 500, 30 grams of Castor oil (CO), 40 grams of 1,4 Butadediol (BDO), and 7 grams of 1,6-Hexamethylene diisocyanate (HDI). The polyethylene glycol (PEG) 500 may be dried using a rotary evaporator for about 6 hours at about 90-95° C. The Castor Oil (CO) may also be dried at about 80° C. under vacuum for about 24 hours. The BDO may also be dried at about 12 hours at about 50° C. using a vacuum oven. To reduce moisture, Poly(ethylene glycol) and CO may be added into a flask and mixed at rotary evaporator with 80 rpm. Then, BDO may be added into the flask and mixed until a homogeneous mixture is obtained. The mixture may then be poured into a reactor equipped with mechanical stirrer, dropping funnel and nitrogen inlet. The mixture may be heated to 50° C. and the Hexamethylene diisocynate may be added to the mixture. The mixture may be left to react for about 150 seconds.

To prepare the film, the reaction mixture may be added to a mold and placed in an oven for about 24 hours at about 80° C. Thin films may also be prepared by hot-pressing. Hot-pressing may be accomplished by placing about 10 to 15 g of polymer between Teflon sheets and setting the hot press temperature to about 110° C., a weight of about 1.4 tons and a time of about 8 minutes.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A resealable bag, comprising:
 a main body including a resealing layer,
 the resealable bag is selectively positionable between an open, unsealed position, and a closed, rolled, and sealed position;
 wherein when the resealable bag is in the closed, rolled, and sealed position, the resealing layer is in a deformed shape; and
 wherein the resealable bag is formed from an inelastic deformable polymer that includes an admixture of poly(lactic acid) and cellulose and contains no metal, and the inelastic deformable polymer has a predetermined shape fixity configured to permit a user to manually manipulate the resealable bag to the closed, rolled, and sealed position where the inelastic deformable polymer retains the deformed shaped.

2. The resealable bag of claim 1, wherein the main body has a plurality of layers in addition to the resealing layer, each of the plurality of layers selected from a group consisting of sealant, thermoplastic resin, biaxially oriented polypropylene, paper, synthetic paper, overprint varnish, plastic, polymer film, cellulosic film, bioplastic film, polypropylene fabric, and combinations thereof.

3. The resealable bag of claim 1, wherein the resealing layer extends a length and a width of the main body of the resealable bag.

4. The resealable bag of claim 1, wherein the resealing layer extends from a bottom seal of the resealable bag to a top seal of the resealable bag.

5. The resealable bag of claim 1, wherein the inelastic deformable polymer consists essentially of an admixture of poly(lactic acid) and cellulose.

6. The resealable bag of claim 1, wherein the inelastic deformable polymer consists of an admixture of poly(lactic acid) and cellulose.

7. The resealable bag of claim 1, wherein the inelastic deformable polymer includes a shape memory polymer.

8. The resealable bag of claim 1, wherein an inner layer is formed from a food safe material.

9. The resealable bag of claim 1, wherein the inelastic deformable polymer has substantially no elastic recovery.

10. The resealable bag of claim 9, wherein the resealing layer has a thickness between about 5 microns and about 2.0 millimeters.

11. The resealing layer of claim 10, wherein the inelastic deformable polymer is configured to provide a barrier for oxygen and moisture.

12. The resealable bag of claim 10, wherein the main body is formed from a panel, and the panel is formed from the resealing layer and an outer layer.

13. The resealable bag of claim 12, wherein the outer layer is formed of a biodegradable or recyclable film.

14. The resealable bag of claim 12, wherein the resealing layer is laminated with the outer layer.

15. The resealable bag of claim 12, wherein the panel further includes an inner layer.

16. The resealable bag of claim 15, wherein the inner layer is formed of a biodegradable or recyclable barrier.

17. The resealable bag of claim 15, wherein the resealing layer is secured between the inner layer and the outer layer.

18. The resealable bag of claim 15, wherein the resealing layer is laminated between the inner layer, and the outer layer, and each of the inner layer and the outer layer includes cellulose.

19. The resealable bag of claim 9, wherein the resealing layer has a thickness between about 25 microns and about 1.0 millimeters.

20. The resealable bag of claim 9, wherein the resealing layer has a first end and a second end, the first end overlapping the second end to form a vertical seal.

* * * * *